(12) United States Patent
Winter

(10) Patent No.: US 8,529,188 B2
(45) Date of Patent: Sep. 10, 2013

(54) FAN NACELLE FLOW CONTROL

(75) Inventor: Michael Winter, New Haven, CT (US)

(73) Assignee: United Technologies Corporation, Hartford, CT (US)

( * ) Notice: Subject to any disclaimer, the term of this patent is extended or adjusted under 35 U.S.C. 154(b) by 1425 days.

(21) Appl. No.: 11/957,780

(22) Filed: Dec. 17, 2007

(65) Prior Publication Data

US 2009/0155072 A1    Jun. 18, 2009

(51) Int. Cl.
*B64D 33/02* (2006.01)

(52) U.S. Cl.
USPC ............... 415/1; 415/126; 415/150; 415/159; 415/914; 244/53 B; 60/226.1

(58) Field of Classification Search
USPC .......... 415/126, 128, 150, 151, 159, 914; 137/15.1, 15.2; 244/53 B; 60/226.1
See application file for complete search history.

(56) References Cited

U.S. PATENT DOCUMENTS

| | | | | |
|---|---|---|---|---|
| 3,533,486 A | * | 10/1970 | Paulson | 181/214 |
| 3,575,259 A | * | 4/1971 | Wilkinson | 181/214 |
| 3,618,876 A | | 11/1971 | Skidmore et al. | |
| 3,623,494 A | | 11/1971 | Poucher | |
| 3,652,036 A | * | 3/1972 | Sans et al. | 244/53 B |
| 3,664,612 A | * | 5/1972 | Skidemore et al. | 244/53 B |
| 3,750,689 A | * | 8/1973 | Britt | 137/15.1 |
| 4,023,644 A | * | 5/1977 | Cowan et al. | 181/222 |
| 4,083,181 A | | 4/1978 | Adamson | |
| 4,132,240 A | * | 1/1979 | Frantz | 137/15.1 |
| 4,722,357 A | | 2/1988 | Wynosky | |
| 4,865,268 A | | 9/1989 | Tracksdorf | |
| 4,993,663 A | | 2/1991 | Lahti et al. | |
| 5,000,399 A | | 3/1991 | Readnour et al. | |
| 5,058,617 A | | 10/1991 | Stockman et al. | |
| 5,143,329 A | | 9/1992 | Coffinberry | |
| 5,743,488 A | | 4/1998 | Rolston et al. | |
| 6,109,566 A | | 8/2000 | Miller et al. | |
| 6,129,311 A | | 10/2000 | Welch et al. | |

(Continued)

FOREIGN PATENT DOCUMENTS

| | | |
|---|---|---|
| FR | 1 204 525 A | 1/1960 |
| FR | 2 153 033 A1 | 4/1973 |
| GB | 2 205 903 A | 12/1988 |

OTHER PUBLICATIONS

European Search Report for EP Application No. 08253893.5, Dec. 6, 2011.

*Primary Examiner* — Edward Look
*Assistant Examiner* — Joshua R Beebe
(74) *Attorney, Agent, or Firm* — Carlson, Gaskey & Olds P.C.

(57) ABSTRACT

This disclosure relates to a gas turbine engine including a core engine that drives a fan. A fan nacelle surrounds the fan and provides an inner surface facing the fan. The fan nacelle includes an inlet lip adjoining the inner surface. A ring is arranged at the inner surface and is axially upstream from the fan. The ring includes a deployed position in which the ring is spaced radially inwardly from the inner surface to provide a gap therebetween through which air flows. The ring also includes a stowed position in which the ring is arranged radially inwardly from the deployed position and proximate to the inner surface. The ring is commanded to the deployed position in response to detecting a first condition, which corresponds to a flow separation condition at the fan nacelle inlet. The ring may be stowed during cruise conditions, for example.

13 Claims, 2 Drawing Sheets

(56) References Cited

U.S. PATENT DOCUMENTS

| | | |
|---|---|---|
| 6,179,251 B1 | 1/2001 | Tindell et al. |
| 6,260,567 B1 | 7/2001 | Gruensfelder et al. |
| 6,276,632 B1 * | 8/2001 | Sanders et al. ............. 244/53 B |
| 6,340,135 B1 | 1/2002 | Barton |
| 6,379,110 B1 | 4/2002 | McCormick et al. |
| 6,390,418 B1 | 5/2002 | McCormick et al. |
| 6,655,632 B1 * | 12/2003 | Gupta et al. ............. 244/53 B |
| 6,708,711 B2 | 3/2004 | Surply et al. |
| 6,764,043 B2 | 7/2004 | Sankrithi et al. |
| 7,048,229 B2 | 5/2006 | Sanders et al. |

* cited by examiner

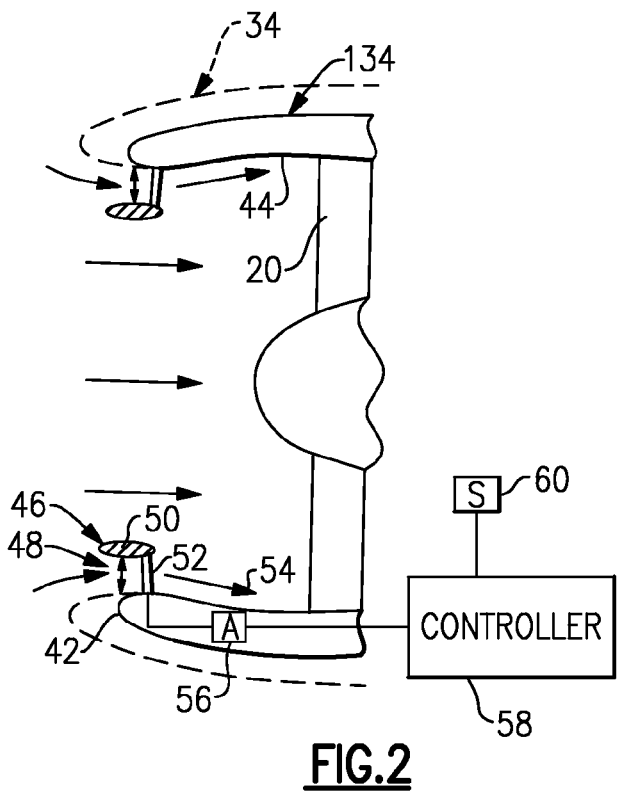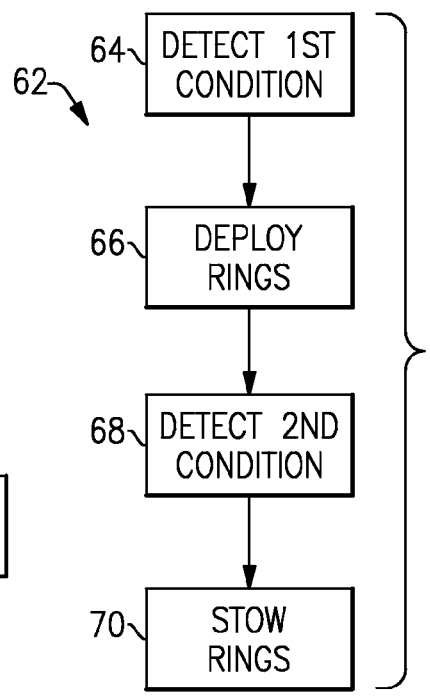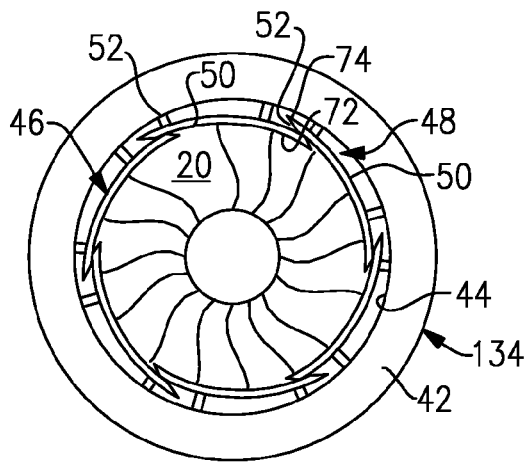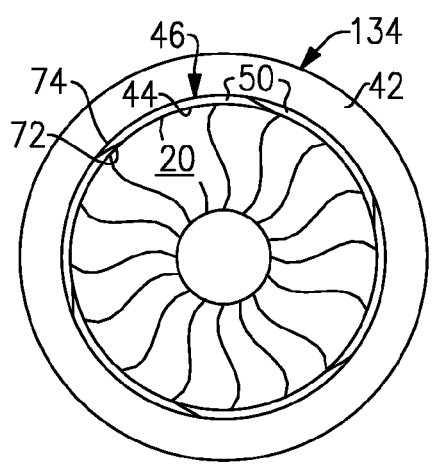

FAN NACELLE FLOW CONTROL

BACKGROUND

This disclosure relates to a fan nacelle for a gas turbine engine and an associated flow control device.

Gas turbine engines for commercial aircraft applications typically include an engine core housed within a core nacelle. In one type of arrangement known as a turbofan engine, the core drives a large fan upstream from the core that provides airflow into the core. A significant portion of airflow bypasses the core to provide thrust. One or more spools are arranged within the core, and a gear train may be provided between one of the spools and the fan. A fan case and fan nacelle surround the fan and at least a portion of the core.

The performance of a turbofan engine varies during diversified conditions experienced by the aircraft. An inlet lip portion located at the foremost end of the fan nacelle is typically designed to enable operation of the turbofan engine and reduce the separation of airflow from the inlet lip of the nacelle assembly during these diversified conditions. For example, the inlet lip requires a "thick" inlet lip to support operation of the engine during specific flight conditions, such as cross-wind conditions, take-off and the like. Disadvantageously, the thick inlet lip may reduce the efficiency of the turbofan engine during normal cruise conditions of the aircraft. As a result, the maximum diameter of the fan nacelle may be approximately 10-20% larger than required during cruise conditions.

In addition, boundary layer separation is a common problem associated with thick inlet lip. Boundary layer separation occurs where airflow communicated through the inlet lip separates from an inner surface of the inlet lip portion, which may cause engine stall, the loss of the capability to generate lift, and may decrease engine efficiency.

One suggested approach to reducing the inlet lip thickness is to provide a flexible inlet that can be deflected to a desired shape to prevent boundary layer separation. Another suggested approach is to deploy structure exteriorly of the fan nacelle to affect the boundary layer flow. In addition, synthetic jets are known which introduce an airflow at the boundary layer to increase the velocity gradient of the oncoming airflow near the boundary separation point. However, these attempts are potentially complex and expensive or intrude into the space exterior of the fan nacelle thereby adding to the overall engine size.

Accordingly, it is desirable to improve the performance of a turbofan gas turbine engine during diversified conditions to provide a fan nacelle having a reduced thickness, reduced weight and reduced drag.

SUMMARY

This disclosure relates to a gas turbine engine including a core engine that drives a fan. A fan nacelle surrounds the fan and provides an inner surface facing the fan. The fan nacelle includes an inlet lip adjoining the inner surface. A ring is arranged at the inner surface and is axially upstream from the fan. The ring includes a deployed position in which the ring is spaced radially inwardly from the inner surface to provide a gap therebetween through which air flows. The ring also includes a stowed position in which the ring is arranged radially inwardly from the deployed position and proximate to the inner surface. The ring is commanded to the deployed position in response to detecting a first condition, which corresponds to a flow separation condition at the fan nacelle inlet. The ring may be stowed during cruise conditions, for example.

These and other features of the disclosure can be best understood from the following specification and drawings, the following of which is a brief description.

BRIEF DESCRIPTION OF THE DRAWINGS

FIG. 2 is a schematic view of a front portion of a fan nacelle including an example flow control device.

FIG. 3 is a flow chart depicting a method of control boundary layer flow entering the fan nacelle.

FIG. 4A is a front elevational view of the fan nacelle with the ring in a deployed position.

FIG. 4B is a front elevational view of the fan nacelle with the ring in a stowed position.

DETAILED DESCRIPTION

Figure 1:
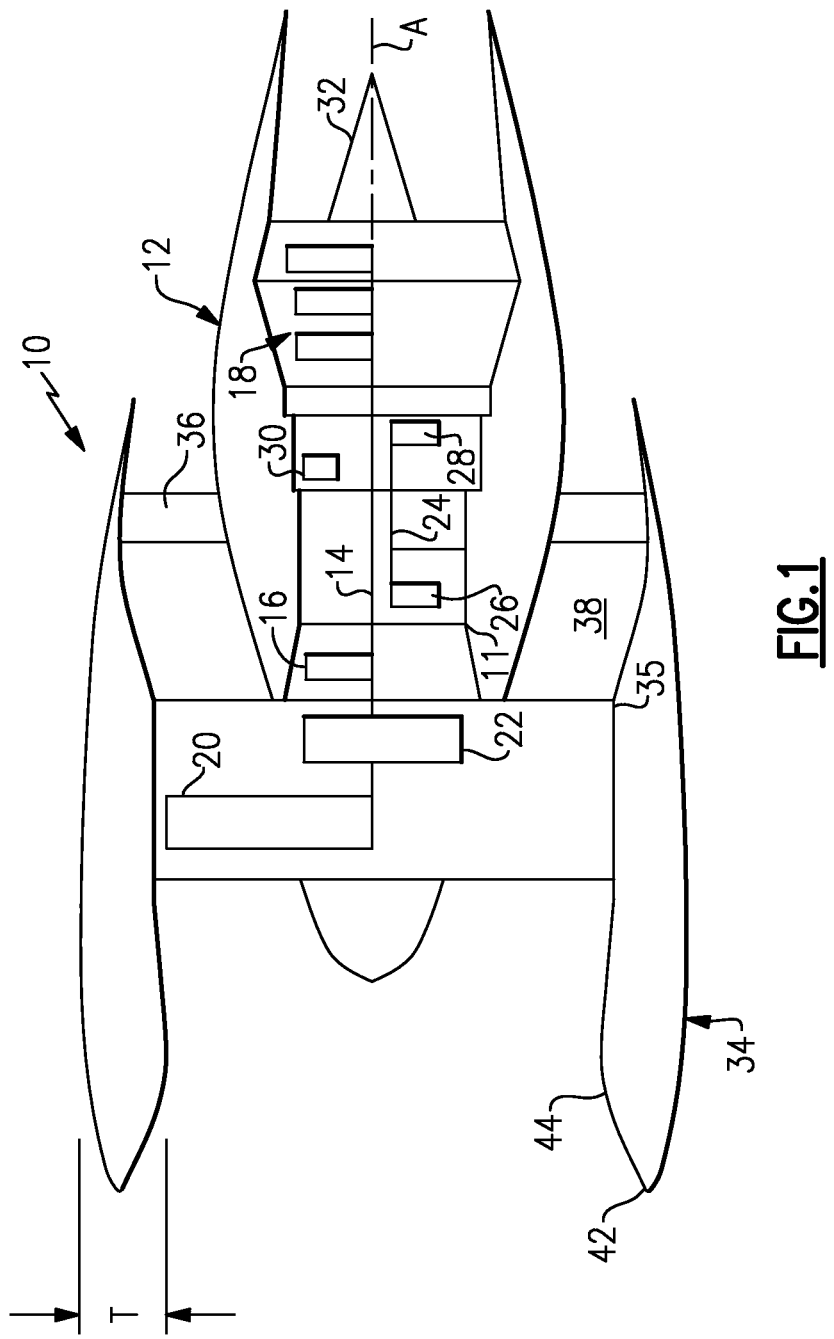
FIG. 1 is a highly schematic view of a turbofan gas turbine engine.

An engine 10 with geared architecture is shown in FIG. 1. A pylon typically secures the engine 10 to an aircraft. The engine 10 includes a core nacelle 12 that surrounds a low spool 14 and high spool 24 that are rotatable about a common axis A. The low spool 14 supports a low pressure compressor 16 and low pressure turbine 18. In the example, the low spool 14 drives a fan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the example shown, the engine 10 is a high bypass turbofan arrangement. In one example, the bypass ratio is greater than 10, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared architecture engine. That is, the invention is applicable to other engines including direct drive turbofans.

Airflow enters a fan nacelle 34, which surrounds the core nacelle 12 and fan 20. The fan 20 directs air into the core nacelle 12, which is used to drive the turbines 18, 28, as is known in the art. Turbine exhaust exits the core nacelle 12 once it has been expanded in the turbines 18, 28, in a passage provided between the core nacelle 12 and a tail cone 32.

A core housing 11 is arranged within the core nacelle 12 and is supported within the fan nacelle 34 by structure 36, such as flow exit guide vanes, extending radially inwardly from a fan case 35. A generally annular bypass flow path 38 is arranged between the core and fan nacelles 12, 34. The examples illustrated in the Figures depict a high bypass flow arrangement in which approximately eighty percent of the airflow entering the fan nacelle 34 bypasses the core nacelle 12. The bypass flow within the bypass flow path 38 exits the fan nacelle 34 through a fan nozzle exit area at the aft of the fan nacelle 34.

The fan nacelle 34 includes an inner surface 44 that faces the fan 20 forming an inlet duct into the engine 10. As shown in FIG. 1, the fan nacelle 34 typically has a thickness T which affects the fuel efficiency of the engine 10 by affecting boundary layer flow and by contributing to the overall size and weight of the engine. It is desirable to reduce this thickness without compromising the operation of the engine 10.

During some engine operating conditions such as crosswinds and high angle of attack maneuvers, the engine 10 is susceptible to flow separation at the inlet lip 42. Delamination of the flow at the inner surface 44 negatively impacts the engine efficiency and operation. It is typically desirable to maintain laminar flow at the inner surface 44 during all conditions. To this end, a ring 46 is arranged at the inner surface 44 upstream from the fan 20. The ring 46 is moved to a deployed position, shown in FIG. 4A, during conditions susceptible to flow separation. The ring 46 is retracted to a stowed position, shown in FIG. 4B, when laminar flow can be achieved without its use.

Referring to FIG. 2, a thinner nacelle 134 results from the use of the ring 46 as compared to the typical nacelle 34. The ring 46 is shown in its deployed position in FIG. 2. In one example, the ring 46 includes multiple circumferentially arranged ring segments 50 interleaved with one another, as best shown in FIGS. 4A and 4B. The ring segments 50 include overlapping first and second ends 72, 74, which avoids circumferential gaps between the ring segments 50 in the stowed position while enabling the ring segments 50 to be reconfigured to a smaller diameter in the deployed position.

In one example, the ring segments 50 are supported relative to the fan nacelle 34 by struts 52. An actuator 56 is connected to the struts 52 for moving the ring segments between the deployed and stowed positions in response to a command from a controller 58. A sensor 60 communicates with the controller 58 and sends a signal indicative of at least one of a first and second condition. The sensor 60 can be more than one discrete sensor, for example. The first condition corresponds to a flow separation condition, for example, during crosswinds and high angle of attack maneuvers. The second condition corresponds to a cruise condition, for example. In the deployed position, best shown in FIG. 4A, the ring 46 is spaced radially inwardly relative to the inner surface 44 to provide an annular gap 48 through which air flows. The air into the fan nacelle 34 flows between the ring 46 and the inner surface 44 maintaining laminar flow 54 at the inner surface 44.

An example boundary layer control process 62 is shown in FIG. 3. A first condition is detected such as a condition typically indicative of a boundary separation at the fan nacelle inlet, which is represented at block 64. The ring 46 is deployed, as indicated at block 66, in response to the first condition. When a second condition is detected, as indicated at block 68, the ring 46 is stowed, as indicated at block 70. The second condition includes conditions during which a flow separation does not or is not likely to occur at the fan nacelle inlet.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a core engine driving a fan;
   a fan nacelle surrounding the fan and providing an inner surface facing the fan, the fan nacelle including an inlet lip adjoining the inner surface; and
   a ring arranged at the inner surface axially upstream from the fan, the ring having a deployed position in which the ring is spaced radially inwardly from the inner surface to provide a gap there between through which air flows, and a stowed position in which the ring is arranged radially outwardly from the deployed position and proximate to the inner surface, wherein the ring includes circumferentially arranged ring segments, the ring segments interleaved with one another at adjacent end portions with the end portions circumferentially overlapping one another, wherein the ring segments are interleaved with one another such that the ring segments overlap one another in both the deployed position and the stowed position, and wherein the entirety of each of the ring segments is spaced radially inward from the inner surface when the ring is in the deployed position.

2. The gas turbine engine according to claim 1, comprising an actuator connected to the ring, and a controller in communication with the actuator and a sensor, the sensor detecting first and second conditions respectively corresponding with the deployed and stowed positions, the controller configured to command the ring between the deployed and stowed positions in response to the sensor detecting the first and second conditions.

3. The gas turbine engine according to claim 2, wherein the first and second conditions respectively correspond to at least a cruise condition and at least a boundary layer flow separation at an inlet of the fan nacelle.

4. The gas turbine engine according to claim 2, comprising struts arranged between the actuator and the ring.

5. The gas turbine engine according to claim 1, wherein the gap corresponds to an annular gap arranged between the ring and the inner surface.

6. The gas turbine engine according to claim 1, wherein the core engine includes low and high spools rotatable about a common axis, wherein each of the low and high spools respectively include low and high pressure turbines.

7. The gas turbine engine according to claim 6, comprising a core nacelle surrounding the core engine, and a bypass flow path arranged between the core nacelle and the fan nacelle.

8. A method of controlling a boundary layer at the inlet of a fan nacelle comprising the steps of:
   detecting a first condition;
   deploying a ring radially inward from a fan nacelle inner surface in response to the first condition, wherein the ring includes circumferentially arranged ring segments, wherein the entirety of each of the ring segments is spaced radially inward from the inner surface to provide a gap there between through which air flows;
   detecting a second condition different than the first condition; and
   stowing the ring radially outward relative to the deploying step in response to the second condition, the ring segments interleaved with one another at adjacent end portions with the end portions circumferentially overlapping one another in a stowed position.

9. The method according to claim 8, wherein the first condition corresponds to a flow separation at a fan nacelle inlet.

10. The method according to claim 8, wherein the deploying step includes forming a gap between the inner surface and the ring permitting airflow through the gap.

11. The gas turbine engine according to claim 1, wherein, when the ring is in the deployed position, the ring segments are supported radially inward of the inner surface by way of a plurality of struts.

12. The gas turbine engine according to claim 1, wherein the ring segments overlap one another more when the ring is in the deployed position than when the ring is in the stowed position.

13. The method according to claim 8, wherein the ring segments are interleaved with one another such that the ring segments overlap one another in both the deployed position and the stowed position.

* * * * *